(12) United States Patent
Hulten et al.

(10) Patent No.: US 8,931,090 B2
(45) Date of Patent: *Jan. 6, 2015

(54) SAFE FILE TRANSMISSION AND REPUTATION LOOKUP

(75) Inventors: Geoff Hulten, Lynnwood, WA (US);
John Scarrow, Sammamish, WA (US);
Ivan Osipkov, Bothell, WA (US);
Kristofer N. Iverson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/412,299

(22) Filed: Mar. 5, 2012

(65) Prior Publication Data

US 2012/0167213 A1 Jun. 28, 2012

Related U.S. Application Data

(63) Continuation of application No. 12/037,936, filed on Feb. 27, 2008, now Pat. No. 8,146,151.

(51) Int. Cl.
*G06F 21/51* (2013.01)
*G06F 21/62* (2013.01)

(52) U.S. Cl.
CPC ............ *G06F 21/6209* (2013.01); *G06F 21/51* (2013.01)
USPC .......................................................... 726/22

(58) Field of Classification Search
CPC ........................... H04L 63/00; H04L 63/1441
USPC .......................................................... 726/22
See application file for complete search history.

(56) References Cited

U.S. PATENT DOCUMENTS

| 5,864,620 | A | 1/1999 | Pettitt |
| 5,995,625 | A | 11/1999 | Sudia et al. |
| 6,092,194 | A | 7/2000 | Touboul |
| 6,792,544 | B2 | 9/2004 | Hashem et al. |
| 2002/0095589 | A1 | 7/2002 | Keech |

(Continued)

FOREIGN PATENT DOCUMENTS

| CN | 1423766 A | 6/2003 |
| JP | 2001518269 A | 10/2001 |

(Continued)

OTHER PUBLICATIONS

"Email Reputation Services", Trend Micro, Dynamic Spam Protection at the Network Layer, Getting Started Guide, Published: Nov. 2007, pp. 1-54.

(Continued)

*Primary Examiner* — Jacob Lipman
(74) *Attorney, Agent, or Firm* — Bryan Webster; Kate Drakos; Micky Minhas

(57) ABSTRACT

A method of safe file transmission and reputation lookup is provided. As a part of the safe file transmission and reputation lookup methodology, a data file that is to be made available to a data file receiver is accessed and it is determined whether the data file needs to be provided a protective file. The data file is wrapped in a protective file to create a non-executing package file. Access is provided to the non-executing package file where the associated data file is prevented from being executed until data file reputation information is received.

20 Claims, 5 Drawing Sheets

(56) References Cited

U.S. PATENT DOCUMENTS

| | | | |
|---|---|---|---|
| 2002/0172367 | A1 | 11/2002 | Mulder et al. |
| 2004/0073810 | A1 | 4/2004 | Dettinger et al. |
| 2006/0053202 | A1 | 3/2006 | Foo et al. |
| 2006/0161988 | A1 | 7/2006 | Costea et al. |
| 2006/0168024 | A1 | 7/2006 | Mehr et al. |
| 2006/0253584 | A1 | 11/2006 | Dixon et al. |
| 2006/0277259 | A1 | 12/2006 | Murphy et al. |
| 2007/0005716 | A1 | 1/2007 | LeVasseur et al. |
| 2007/0113282 | A1* | 5/2007 | Ross .................... 726/22 |
| 2007/0118669 | A1* | 5/2007 | Rand et al. ............ 709/245 |
| 2007/0130351 | A1 | 6/2007 | Alperovitch et al. |
| 2007/0136808 | A1 | 6/2007 | Xiong |
| 2007/0143407 | A1 | 6/2007 | Avritch et al. |
| 2007/0180078 | A1 | 8/2007 | Murphy et al. |
| 2007/0245417 | A1* | 10/2007 | Lee et al. ............. 726/22 |

FOREIGN PATENT DOCUMENTS

| | | |
|---|---|---|
| JP | 2002197035 A | 7/2002 |
| JP | 2004118692 A | 4/2004 |
| JP | 2004515166 A | 5/2004 |
| JP | 2004355372 | 12/2004 |
| JP | 2007295162 A | 11/2007 |

OTHER PUBLICATIONS

Apgar; Chris, "Secure data transmission methods", Published: Jan. 17, 2006, http://searchsecurity.techtarget.com/tip/0,289483,sid14_gci1159630,00.html, pp. 1-4.

"Automatic protection against malware, prevention of unauthorized applications", AppSense, Application Manager Desktop Edition, Publication: 2005, pp. 1-2.

"European Search Report", Mailed Date: Jul. 6, 2011, Application No. EP/09714849, pp. 5.

"International Search Report and Written Opinion", Mailed Date: Apr. 22, 2009, Application No. PCT/US2009/032005, pp. 1-9.

Balzer, Robert, "Assuring the Safety of Opening Email Attachments", Proceedings of DARPA Information Survivability Conference & Exposition II (D1SCEX '01), vol. 2, Jun. 12-14, 2001, pp. 257-262.

Zou, et al., "Feedback Email Worm Defense System for Enterprise Networks", Technical Report: TR-04-CSE-05, University of Massachusetts, Amherst, USA, Apr. 16, 2004, pp. 1-8.

Non-Final Office Action cited in related U.S. Appl. No. 12/037,936 Dated Dec. 15, 2010, pp. 1-19.

Response to Dec. 15, 2010 Non-Final Office Action in related U.S. Appl. No. 12/037,936, filed Mar. 15, 2011, pp. 1-13.

Final Office Action cited in related U.S. Appl. No. 12/037,936 Dated Apr. 18, 2011, pp. 1-9.

Response to Apr. 18, 2011 Final Office Action in related U.S. Appl. No. 12/037,936, filed Jun. 20, 2011, pp. 1-14.

Non-Final Office Action cited in related U.S. Appl. No. 12/037,936 Dated Jul. 15, 2011, pp. 1-8.

Response to Jul. 15, 2011 Non-Final Office Action in related U.S. Appl. No. 12/037,936, filed Sep. 22, 2011 pp. 1-13.

Notice of Allowance cited in U.S. Appl. No. 12/037,936 Dated Nov. 18, 2011, pp. 1-10.

Fourth Chinese Office Action cited in Chinese Application No. 200980106986.8 dated Oct. 12, 2013, 8 pgs.

Int. Preliminary Report cited in PCT Application No. PCT/US2009/032005_8_31_10, 6 pgs.

First Chinese Office Action cited in Chinese Application No. 200980106986.8 dated Jul. 23, 2012, 11 pgs.

Reply first Chinese Office Action cited in Chinese Application No. 200980106986.8 dated Nov. 30, 2012, 4 pgs.

Second Chinese Office Action cited in Chinese Application No. 200980106986.8 dated Feb. 5, 2013, 8 pgs.

Third Chinese Office Action cited in Chinese Application No. 200980106986.8 dated May 17, 2013, 8 pgs.

Reply third Chinese Office Action cited in Chinese Application No. 200980106986.8 dated Jul. 11, 2013, 4 pgs.

Reply fourth Chinese Office Action cited in Chinese Application No. 200980106986.8 dated Dec. 27, 2013, 4 pgs.

Final Chinese Office Action cited in Chinese Application No. 200980106986.8 dated Oct. 12, 2013, 8 pgs.

Reply final Chinese Office Action cited in Chinese Application No. 200980106986.8 dated Aug. 8, 2014, 4 pgs.

EP Communication cited in EP Application No. 09714849.8 dated Feb. 25, 2011, 1 pg.

Reply EP Communication cited in EP Application No. 09714849.8 dated Jan. 19, 2012, 10 pgs.

EP Notice of Allowance cited in EP Application No. 09714849.8 dated Jul. 5, 2012, 40 pgs.

Japanese Office Action cited in Japanese Application No. 2010-548767 dated Feb. 17, 2012, 7 pgs.

Reply Japanese Office Action cited in Japanese Application No. 2010-548767 dated Jun. 6, 2012, 9 pgs.

Japanese Office Action cited in Japanese Application No. 2010-548767 dated Aug. 31, 2012, 2 pgs.

Japanese Notice of Allowance (Claims) cited in Japanese Application No. 2010-548767 dated Sep. 10, 2012, 3 pgs.

* cited by examiner

SAFE FILE TRANSMISSION AND REPUTATION LOOKUP

RELATED APPLICATION

This application is a continuation of U.S. application Ser. No. 12/037,936, filed on Feb. 27, 2008, entitled "SAFE FILE TRANSMISSION AND REPUTATION LOOKUP," at least some of which may be incorporated herein.

BACKGROUND

In a typical computer network, computer systems are coupled in the computer network in a manner that enables the computer systems to access data from a variety of sources. Data accessed by such network coupled computer systems can be taken from internal and external sources of information. Unfortunately, often times the data that is accessed can include malicious software that is designed to infiltrate and/or damage the computer systems. Such malicious software is called "malware."

Malware as used herein can include but is not limited to computer viruses, worms, trojan horses, spyware and some adware. For reasons that are apparent, malware operates without the informed consent of computer system owners. Moreover, malware can be designed to frustrate computer system software (or hardware), such as antivirus programs, that can be installed on the computer system as a defense against active malware.

Malware has become a major problem for computer users all over the world and is increasingly used by criminals as a means to conduct unlawful business enterprises. When a computer has been infected with malware for such purposes, the computer user is generally unaware that their machine has been infected and do not know that their otherwise legitimate status has been hijacked. Moreover, their machine can operate, unbeknownst to the computer user, as a base for the spread of malware or the conduct of illegal activities. The effectiveness of such malfeasance makes the distribution of malware an especially troublesome and problematic part of online communication today. For example, in Windows Live Hotmail, it is estimated that 0.001% of all email contains known malware and that only 1% of all email containing executable attachments is considered to be legitimate or "good".

Data file attachments to electronic communications such as email provide a particularly useful platform for the distribution of malware. Individuals who receive electronic communications (e.g., email, links to data files) that have a data file attachment, are particularly vulnerable as they generally do not possess sufficient information about the data file attachment to determine if they can safely open it. It should be appreciated that this is true even if the data file attachment is from a trusted sender because the trusted sender's computer may be compromised by malware unbeknownst to the sender. Conventional, antivirus programs do not address the information deficit that renders computer system users vulnerable to malware infection derived from such data file attachments. Accordingly, conventional antivirus programs are inadequate to prevent infection from malware that can be associated with data files that are attached to electronic communications.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Conventional antivirus programs are inadequate to prevent infection from malware that can be borne by data files that are attached to electronic communications (e.g., email, links). In one embodiment, data files (e.g., text file, downloadable content, etc.) are wrapped in a protective wrapper to prevent access to the data files until reputation information related to the data file is accessed. Receivers of the data file (e.g., email recipients) can make an informed decision as it relates to opening the data file. As a part of the disclosed safe data file transmission and reputation lookup methodology, a data file that is to be made available to a data file receiver is accessed. Thereafter, it is determined whether the data file needs to be provided a protective wrapper. If it is determined that the data file needs to be provided a protective wrapper, the data file is provided a protective wrapper to create a non-executing package file and is prevented from being executed until data file reputation information (e.g., information related to the legitimacy or suspiciousness of file) is received. The non-executing package file is then made available to the intended data file receiver and the associated data file is made accessible upon receipt of data file reputation information.

BRIEF DESCRIPTION OF THE DRAWINGS

The accompanying drawings, which are incorporated in and form a part of this specification, illustrate embodiments and, together with the description, serve to explain the principles of the embodiments.

The drawings referred to in this description should not be understood as being drawn to scale except if specifically noted.

DETAILED DESCRIPTION

Reference will now be made in detail to various embodiments, examples of which are illustrated in the accompanying drawings. While descriptions will be provided in conjunction with these embodiments, it will be understood that the descriptions are not intended to limit the scope of the embodiments. On the contrary, the disclosure is intended to cover alternatives, modifications and equivalents, of these embodiments. Furthermore, in the following description, numerous specific details are set forth in order to provide a thorough understanding of embodiments. In other instances, well-known methods, procedures, components, and circuits have not been described in detail as not to unnecessarily obscure aspects of embodiments.

Figure 1A:
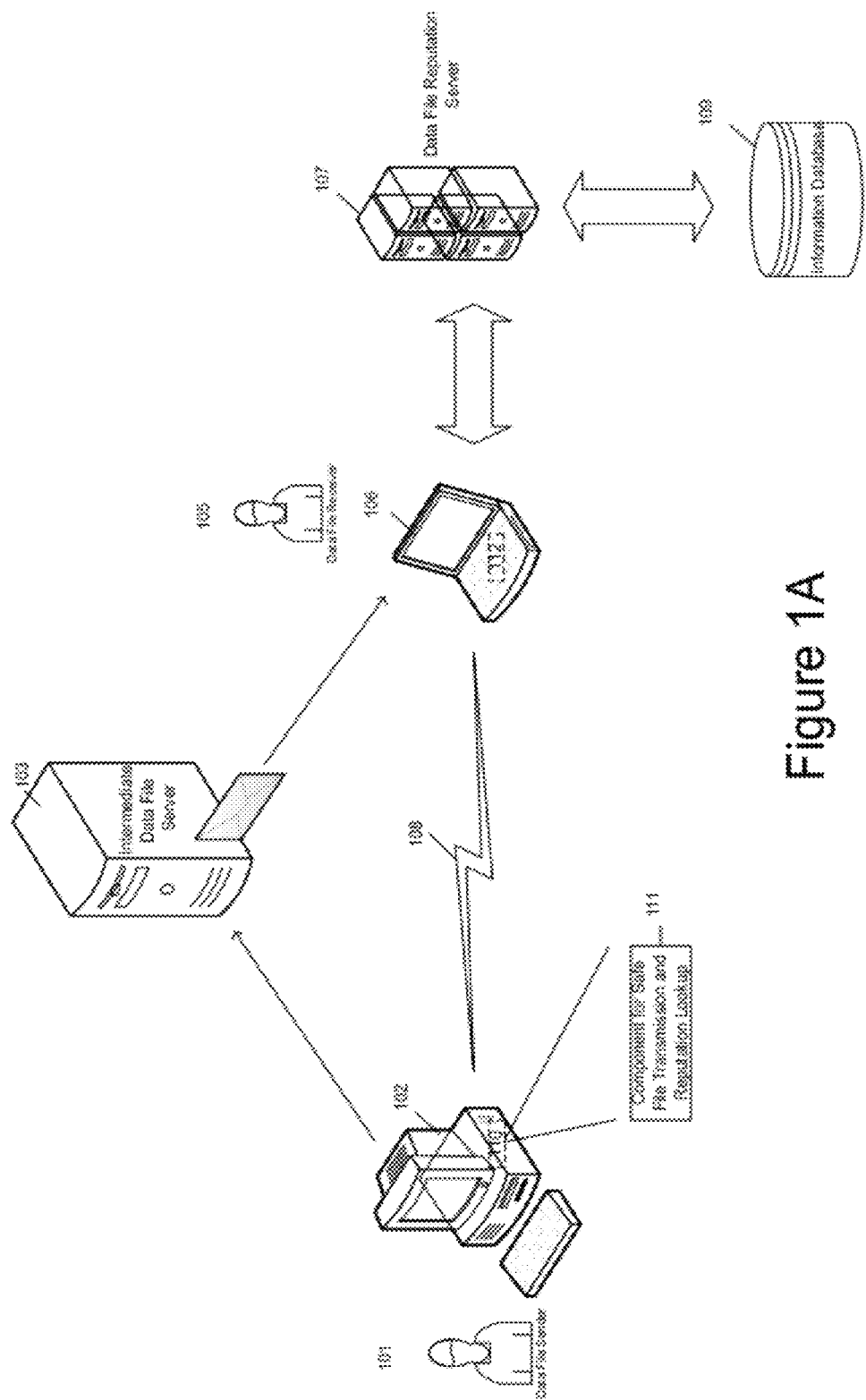
FIG. 1A shows an exemplary setting of a component for safe file transmission and reputation lookup according to one embodiment.

Exemplary Network Setting of System for Safe File Transmission and Reputation Lookup According to Embodiments FIG. 1A shows an exemplary setting of a component 111 for safe file transmission and reputation lookup according to one embodiment. In one embodiment, receivers of electronic communications are protected from inadvertently executing malware in a manner does not burden senders of electronic communications with restrictions that prevent them from attaching data that they desire to send. In one embodiment, component 111 wraps data files in a protective wrapper that prevents access to the data files until reputation information related to the data file is accessed. Accordingly, receivers can make an informed decision as it relates to opening a file. FIG. 1A shows data file sender 101, data file sending device 102, intermediate data file server 103, data file receiver 105, data file receiving device 106, data file reputation server 107, network link 108, information database 109, data file sending application 110, component 111 and data file receiving application 112.

Referring to FIG. 1A, data file sending device 102, allows a data file sender 101 to send or make data files available to a data file receiver 105 who can access the data file using data file receiving device 106. In one embodiment, the data file that is sent or made available to data file receiver 105 may not be directly opened through a client application that executes on data file receiving device 106. In one embodiment, data file receiver 105 can be prevented from opening the data file until data file reputation server 107 is queried for reputation information related to the accessed data file.

In one embodiment, data file sending application 110 executes on data file sending device 102 and at the direction of data file sender 101 makes data files available to data file receiver 106 through data file receiving application 112. In one embodiment, data file sending application 110 and/or data file receiving application 112 can include but are not limited to email applications and instant messenger applications. In addition, a data file can be made available to data file receiver 106 through a website such as Spaces.Live.com.

Intermediate data file server 103 (optional) is situated between data file sending device 102 and data file receiving device 106. In one embodiment, data file sender 101 can send data files to intermediate data file server 103 to be forwarded to data file receiver 105. In one embodiment, data files can be wrapped in a protective file at intermediate data file server 103 before being forwarded to data file receiver 105.

File reputation server 107 provides file reputation information, to client devices such as data file sending application 110 and data file receiving application 112, that is related to received data files and that details the safeness or suspiciousness of the received data files. In one embodiment, file reputation server 107 includes an associated information database 109 that is a repository of file reputation information related to data files. In one embodiment, file reputation server 107 must be queried before a data file can be opened by data file receiver 105. File reputation server 107 can accept requests that contain information about a data file and can use the information to identify information that is stored in information database 109 related to all known good and bad elements.

In one embodiment, based on the data file that file reputation server 107 is queried about, file reputation server 107 identifies reputation information that is stored in information database 109 and provides this information to data file receiver 105. In one embodiment, the information that is provided to data file receiver 105 details the safeness or suspiciousness of the data file.

Component 111 directs the safe transmission and reputation lookup of data files that data file sender 101 makes available to data file receiver 105. In one embodiment, component 111 directs the wrapping of data files in a protective wrapper that prevents access to the data file until reputation information related to the file is accessed. In one embodiment, as a part of the herein described safe transmission methodology, component 111 can access a data file that is to be made available to data receiver, determine whether the data file needs to be protected and wrap the data file in a protective file to create a non-executing package file. In one embodiment, the non-executing package file cannot be unwrapped until file reputation server 107 is queried for and provides feedback reputation information about the data file that is associated with the non-executing package file.

In one embodiment, (as shown in FIG. 1A) component 111 can be a part of data file sending application 110 (or data file receiving application 112). In another embodiment, component 111 can be separate from data file sending application 110 (or data file receiving application 112) but operate cooperatively therewith. In one embodiment, components of component 111 can reside (execute) on data file sending device 102, data file receiving device 106 and/or intermediate data file server 103. In one embodiment, components of component 111 can be included as a part of the non-executing package file (see reputation information accessor discussed in detail herein with reference to FIG. 1B and FIG. 2). In one embodiment, component 111 or components thereof can comprise a separate executable that wraps the data file and is transmitted from the sender to the receiver.

Operational Overview

Figure 1B:
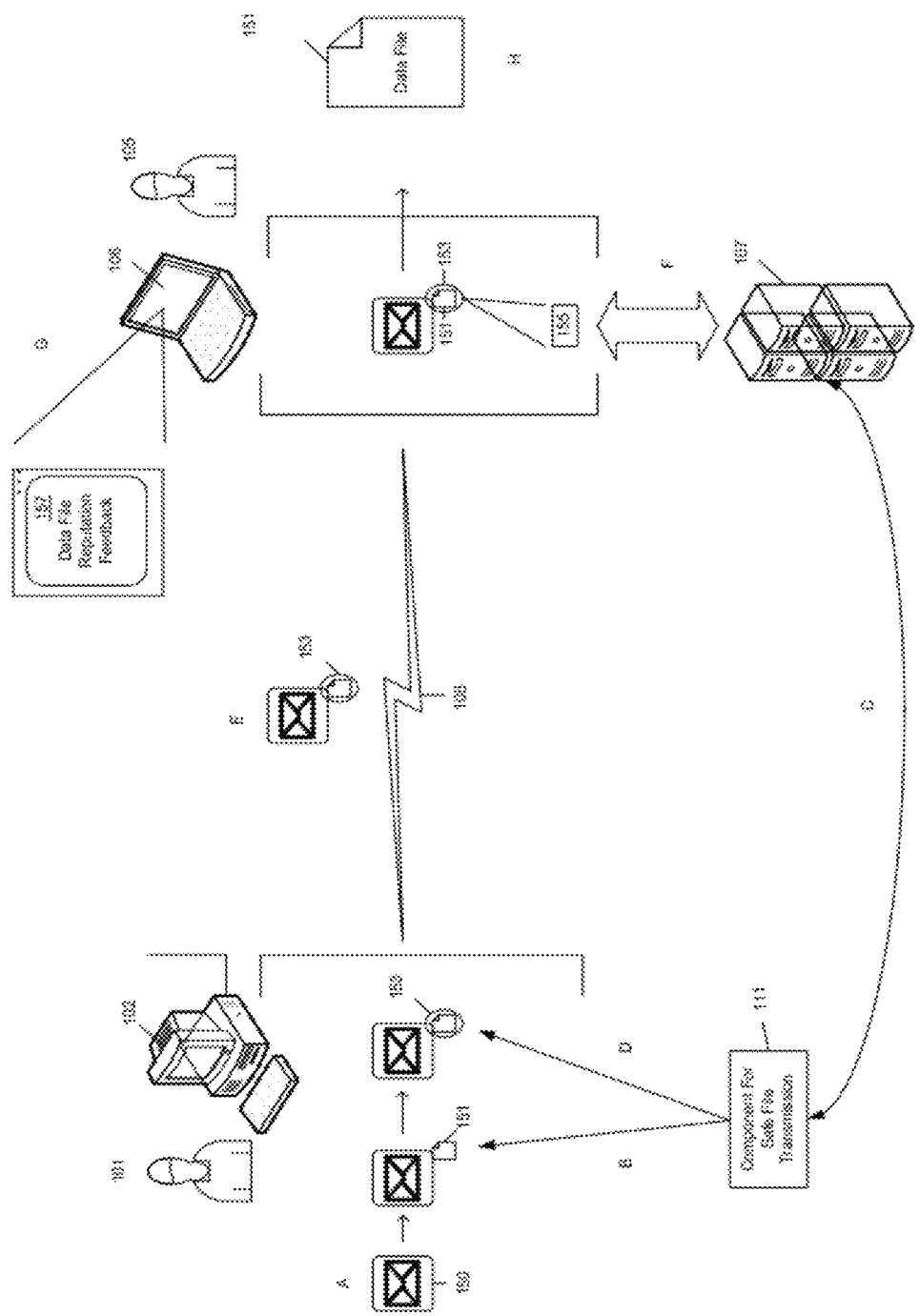
FIG. 1B illustrates the wrapping of a data file and reputation lookup operations according to one embodiment.

FIG. 1B illustrates operations A-H performed in a safe data file transmission and reputation lookup process according to one embodiment (email transmission embodiment without intermediate data file server). These operations including the order in which they are presented are only exemplary. In other embodiments, other operations in other orders can be included.

Referring to FIG. 1B, at A, data file sender 101 creates an email message 150 to which, data file sender 101 attaches data file 151 which is to be made available to data file receiver 105. In response, at B, component 111 accesses data file 151. If it determines, at C, that it is appropriate to wrap data file 151 in a protective file, at D, component 111 directs the wrapping of data file 151 to form non-executing package file 153. Thereafter, at E, non-executing package file 153 is made available to data file receiver 105.

As discussed above, in one embodiment, non-executing package file 153 cannot be directly opened by file receiver 105. Referring again to FIG. 1B, non-executing package file 153 can include reputation information accessor 155 which, at F, requests and retrieves information from file reputation server 107 that can be presented, at G, to data file receiver 105 such a via user interface 157 of receiving device 106. The data file receiver 105 is then able to make an informed decision regarding the opening of data file 151 at H.

Details of Exemplary Implementations

In one embodiment, as discussed hereinabove, a component (e.g., 111 in FIG. 1A) is provided that allows a communications system user to transmit a data file which can be safely made into a non-executing package which contains an encoded version of the data file. Additionally, all the detail needed for a receiver to lookup reputation data related to the data file from a reputation server (e.g., 107 in FIG. 1A) or to contact the data file sender (e.g., 101 in FIG. 1A) via a secure channel to be sure the data file is legitimate before re-enabling the data file to be executable, is provided. This allows the reputation server (e.g., 107 in FIG. 1A) an opportunity to provide feedback on the quality of the file before the receiver can open/execute malware and at a point in time where the reputation server may have learned more information than when the data file was sent by an unknowing or malevolent sender.

In one embodiment, a data file sender (e.g., 101 in FIG. 1A) can choose to make a data file available to another. For example, the data file sender can attach a data file to a data communication to be communicated through a data communication system (e.g., data file sending application 110 in FIG. 1A) like instant messenger, email, or make a data file available for download through a website like Spaces.Live.com. The data file sending application or service can make a determination about whether the data file needs to be protected based on known information about the data file (e.g., known exploits). This information can be provided based on the sending application policy or made available from a file reputation server (e.g., 107 in FIG. 1A). If the data file needs to be protected, perhaps because it is a native executable or because the data file type is known to have an exploit, the original data file can be wrapped in a new protective data file.

The wrapping of the original data file can be performed in a variety of locations: (1) a process can be invoked on a data file sending device (e.g., 102 in FIG. 1A) that takes the original data and wraps it inside a protective data file before transmission when a data file sender using a communication application like email or instant messenger chooses to attach the data file, (2) an intermediate data file server (e.g., 103 in FIG. 1A) can take the original data file and wrap it inside a protective data file after a data file sender sends the original file to the intermediate data file server, which can be located between the data file sender and the data file receiver, (3) a receiving application (e.g., 112 in FIG. 1A) can automatically repackage an incoming data file with a protective file before the receiver is able to view or open them.

In one embodiment, the protective data file can contain special instructions for the data file receiver, a description of the original data file such as filename, and the original data file. In one embodiment, optionally, the process of wrapping the original data file with the protective data file can perform additional beneficial operations such as the compression of the original data file. Additionally, in one embodiment, optionally, the component for safe data file transmission (e.g., 111 in FIG. 1A) can provide a receiving application (e.g., 113 in FIG. 1A) a link to a server where the original data file is stored instead of encoding the original bits in the protective data file. This is especially useful for very large data files, or data files sent to a very large number of people.

In one embodiment, optionally, the data file sender (e.g., 101 in FIG. 1A) can lookup the reputation for the data file at a central service before the data file is packaged for transmission so that the data file sender is advised of any known issues before the data file is sent. In one embodiment, the protective file can then be sent to an intermediate data file server or to a data file receiving device for access by data file receiver (e.g., 105 in FIG. 1A). In another embodiment, the data file can be stored on the central service and the data file receiver (e.g., 105 in FIG. 1A) can be sent a link where they can obtain more information about the data file and determine whether they want the data file on their computer before initiating the transfer.

There are several ways in which the protective data file can be handled upon its reception by the receiving application: (1) the receiving application (e.g., 112 in FIG. 1A) can be made aware of the protective wrappers and can natively lookup the reputation of the data file contents and can present a user interface to the data file receiver describing the quality of the data inside and how they want to proceed, (2) where the receiving application (e.g., 112 in FIG. 1A) is not aware of the protective wrapper, the receiver can be allowed to open the protective wrapper, launching an application that provides the logic needed to lookup the reputation of the original data file and that provides a user interface to the data file receiver that displays information related to the quality of the data inside the protective wrapper and how they want to proceed, (3) where the receiving application (e.g., 112 in FIG. 1A) is not aware of the protective wrapper, and the component for safe data file transmission (e.g., 111 in FIG. 1A) has prevented execution of native applications, an external application can be configured to operate in conjunction with the operating system on the data file receiving device to allow the data file to be opened based on a file extension. This is similar to how ZIP file users are able to access ZIP files. In one embodiment, when the data file receiver opens the attachment an external application can be launched with instructions that describe how to handle the download. (4) The data file receiver (e.g., 105 in FIG. 1A) can be directed to a web site where they can obtain information about the original binary (the binary upon which the original data file can is based) and the tools that they need to recover the binary (data file). (5) The protective wrapper can comprise an executable that wraps the non-executable data file and can provide the logic needed to lookup the reputation of the original data file and that provides a user interface to the data file receiver that displays information related to the quality of the data inside the protective wrapper and how they want to proceed.

In all of the above discussed cases a process can be invoked by the data file receiver (e.g., 105 in FIG. 1A) that enables an extraction of the original data file from the wrapper and allows its placement into memory. Moreover, the process that is invoked can securely transmit information about the data file to a file reputation server (e.g., 107 in FIG. 1A). In one embodiment, the process that is invoked can send meta-information about the data file and the original data file contents in its entirety.

In one embodiment, the file reputation server (e.g., 107 in FIG. 1A) can accept requests containing information about the original data file and can access an information database (e.g., 109 in FIG. 1A) that is associated with it that contains all known good and bad reputation data. In one embodiment, the file reputation server can determine the safeness or suspiciousness of the original data file based on information accessed from the information database and send this information back to the receiver application (e.g., 112 in FIG. 1A) for access by the data receiver (e.g., 105 in FIG. 1A).

In one embodiment, the file reputation server (e.g., 107 in FIG. 1A) can use multiple sources of data to provide a multifaceted analysis of the safeness of the original data file, e.g., if an executable comes from an unknown sender with an IP in the dynamic range, or if the IP has sent malware in the past, the file reputation server can inform a data file sender or receiver that the executable is highly suspicious. This can help to steer correspondents away from harmful attachments that anti-virus programs have not caught up with, and drives up costs for those attempting to send malware. In one embodiment the file reputation server can record information about the data file for which a system user is requesting information for future evaluation. In addition, to the response from the file reputation server, the receiving device (e.g., 106 in FIG. 1A) can be examined to determine if the most up-to-date version of software is being used. For example, a particular data file may be considered suspicious unless the receiving device is running a specific version of an operating system or higher in which a known vulnerability was corrected.

In one embodiment, a user interface (e.g., 157 in FIG. 1B) can be provided to a system user that allows the presentation of information that indicates the quality of a data file based on the reputation information obtained from the file reputation service and what it is able to determine from the data file receiver's local environment (e.g., type of operating system that is possessed by data file receiver). For example, the data file may be known good/high quality, suspicious, known bad/malware, etc. In one embodiment, this information can be presented to the system user (data file sender or receiver) along with controls allowing the customer to proceed.

In the case where the information is known to be good, the system user can be enabled to open and save the original data file. However, in the case where the information is known to be bad the system user can be restricted from opening and saving the original data file unless they specifically override a warning that can be presented to them in the user interface (e.g., 157 in FIG. 1B) and in one embodiment send details to the file reputation server that indicates that a mistake was made.

In one embodiment, in the case where a data file is deemed suspicious a system user can be enabled to open and save the original data file after reviewing a warning that indicates the level of suspiciousness involved, which can include: (1) information related to the number of users in the network who have executed the file, (2) information related to the number of times the file has traveled through the network, (3) information on the first date and time when the file was observed, (4) information related to whether or not a malware analyst has reviewed the file, (5) information related to the certificate that was used to sign the executable and a link to the company that controls that certificate, (6) a link to a search page or discussion group where more information on the data file can be found, (7) some summary of (1)-(7) that provides an overall suspicion level.

In one embodiment, if a data file receiver requests that the original data file be saved, a process can be invoked to extract the original data file. In one embodiment, the data file can be extracted from the memory structure or taken from a server. The original data file can then be saved to a location on the disk that the system user specifies based on the information included from the system user.

The original data file can then be opened on the data file receiving device (e.g., 106 in FIG. 1A). It should be appreciated that the process that extracts original data files from protected files can keep a log of operations it performs and can occasionally submit them to the file reputation server (e.g., 107 in FIG. 1A) for evaluation. Information about data files that are being transmitted across a network can help in the buildup of information that is accessible by the file reputation server through its associated information database. Other data in the information database can come from antivirus scanners, third parties and other outside processes.

In one embodiment, data file receivers are prevented from inadvertently executing data files and provides data file receivers with specific information about the quality of an attachment before they attempt to execute it even if the file reputation server has no knowledge of the original data file. In one embodiment, data file senders are allowed to attach the data files that they are interested in sending without being burdened by onerous restrictions (like the renaming of files). Finally, if the data file receiver determines the data file to be malicious they can request that the original sender be contacted so that they can provide information about why their computer may have sent a malicious file along with any mitigations and tools for correcting the problem.

Figure 2:
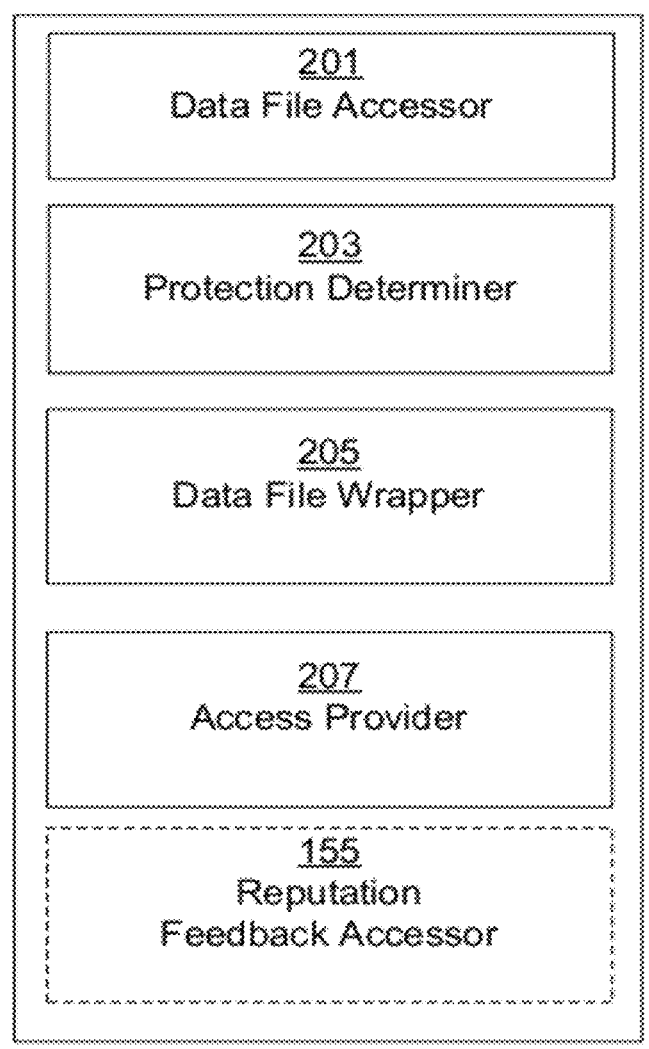
FIG. 2 shows a system for safe file transmission and reputation lookup according to one embodiment.

Subcomponents of Component for Safe File Transmission and Reputation Lookup According to Embodiments FIG. 2 shows subcomponents of component 111 for safe file transmission and reputation lookup according to one embodiment. In one embodiment, component 111 implements an algorithm for safe transmission and reputation lookup. In the FIG. 2 embodiment, component 111 includes data file accessor 201, protection determiner 203, data file wrapper 205, access provider 207 and reputation information accessor 155.

It should be appreciated that aforementioned subcomponents of system 111 can be implemented in hardware or software or in a combination of both. In one embodiment, subcomponents and operations of component 111 can be encompassed by components and operations of one or more computer programs (e.g., data file sending application 110, data file receiving application 112, etc., in FIG. 1A). In another embodiment, components and operations of system 111 can be separate from the aforementioned one or more computer programs but can operate cooperatively with components and operations thereof.

Referring to FIG. 2, data file accessor 201 accesses data files that are to be made accessible to data file receivers. In one embodiment, data file accessor 201 accesses the data files that the data file sender intends to make available to data file receivers.

Protection determiner 203 determines whether the data files accessed by data file accessor 201 need to be protected. In one embodiment, protection determiner can make the determination based on the service policy of the sending application or on information provided by a file reputation service (e.g., 101 in FIG. 1A).

Data file wrapper 205 wraps data files in a protective file to create a non-executing package file. In one embodiment, the protective file prevents data file receivers from being able to directly open the associated data file. In one embodiment, the non-executing package file can include an encoded version of the original data file and the data needed to lookup reputation information from a data file reputation service.

Access provider 207 makes the non-executing package file available for access by a file receiver. In one embodiment, the non-executing package file cannot be opened until information is retrieved from a reputation server related to the legitimacy or the suspiciousness of the associated data file. The provision of access by access provider 207 can include but is not limited to transmission of the data file to a data file receiver, providing a link to the data file, or storing the data file in memory where it can be later retrieved.

Reputation information accessor 155 accesses information from a reputation lookup server that is related to the legitimacy or the suspiciousness of the data file. In one embodiment, the information can be presented to the data file receiver (or the data file sender) in a user interface (e.g., 157 in FIG. 1B). In one embodiment, reputation information accessor 155 can be included as a part of the non-executing package file that is made available to a data file receiver.

As discussed herein, in one embodiment, (as shown in FIG. 1A) component 111 can be a part of a data file sending application or a data file receiving application (e.g., 110 and 112 in FIG. 1A). In another embodiment, component 111 can be separate from a data file sending application or a data file receiving application but can operate cooperatively therewith. In one embodiment, components of component 111 can reside (execute) on a data file sending device (e.g., 102 in FIG. 1A), data file receiving device (e.g., 106 in FIG. 1A) and/or an intermediate data file server (e.g., 103 in FIG. 1A). In one embodiment, components of component 111 can be included as a part of the non-executing package file (see reputation information accessor 155 discussed above).

Figure 3:
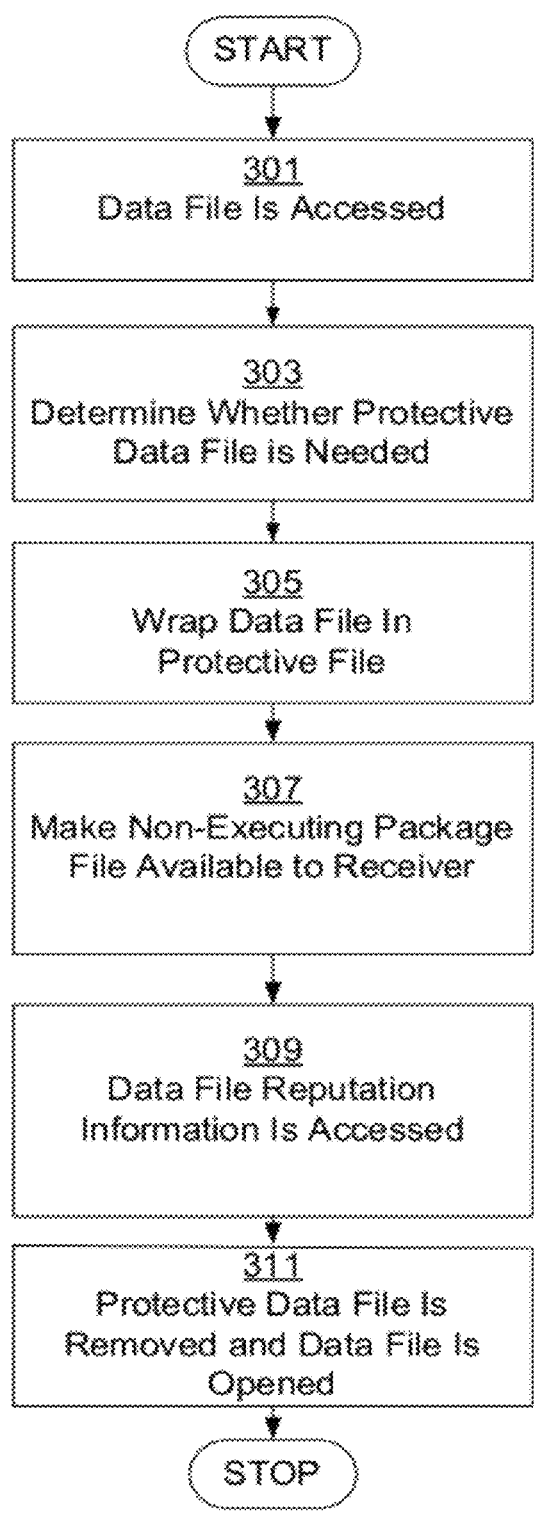
FIG. 3 shows a flowchart of the steps performed in a method for safe file transmission and reputation lookup according to one embodiment.

Exemplary Operations of Method for Safe File Transmission and Reputation Lookup According to Embodiments FIG. 3 shows a flowchart 300 of the steps performed in a method for safe file transmission and reputation lookup according to one embodiment. The flowchart includes processes that, in one embodiment can be carried out by processors and electrical components under the control of computer-readable and computer-executable instructions. Although specific steps are disclosed in the flowcharts, such steps are exemplary. That is the present invention is well suited to performing various other steps or variations of the steps recited in the flowcharts. Within various embodiments, it should be appreciated that the steps of the flowcharts can be performed by software, by hardware or by a combination of both.

Referring to FIG. 3, at 301 a data file is accessed. In one embodiment, a data file accessor (e.g., 201 in FIG. 2) can be used to access the aforementioned data file. In one embodiment, the data file accessor accesses a data file that a data file sender intends to make available to a data file receiver.

At 303, it is determined whether a protective data file is needed. In one embodiment, a protection determiner (e.g., 203 in FIG. 2) can make the determination based on the sending application service policy or on information provided by a file reputation service (e.g., 107 in FIG. 1A).

At 305, the data file is wrapped in a protective file to create a non-executing package file. In one embodiment, the protective file prevents the data file receiver from being able to directly open the associated data file. In one embodiment, the non-executing package file can include an encoded version of the data file and information that the data file receiver will need to retrieve data file reputation information.

At 307, the non-executing package file is made available for access by a file receiver. In one embodiment, the non-executing package file cannot be opened until information is retrieved from a reputation server related to the legitimacy or the suspiciousness of the data file.

At 309, information is accessed from a reputation lookup server that is related to the legitimacy or the suspiciousness of the data file. In one embodiment, the information can be presented to the data file receiver (or the data file sender) in a user interface (e.g., 157 in FIG. 1B). And at 311, the protective file is removed and the data file is opened.

Figure 4:
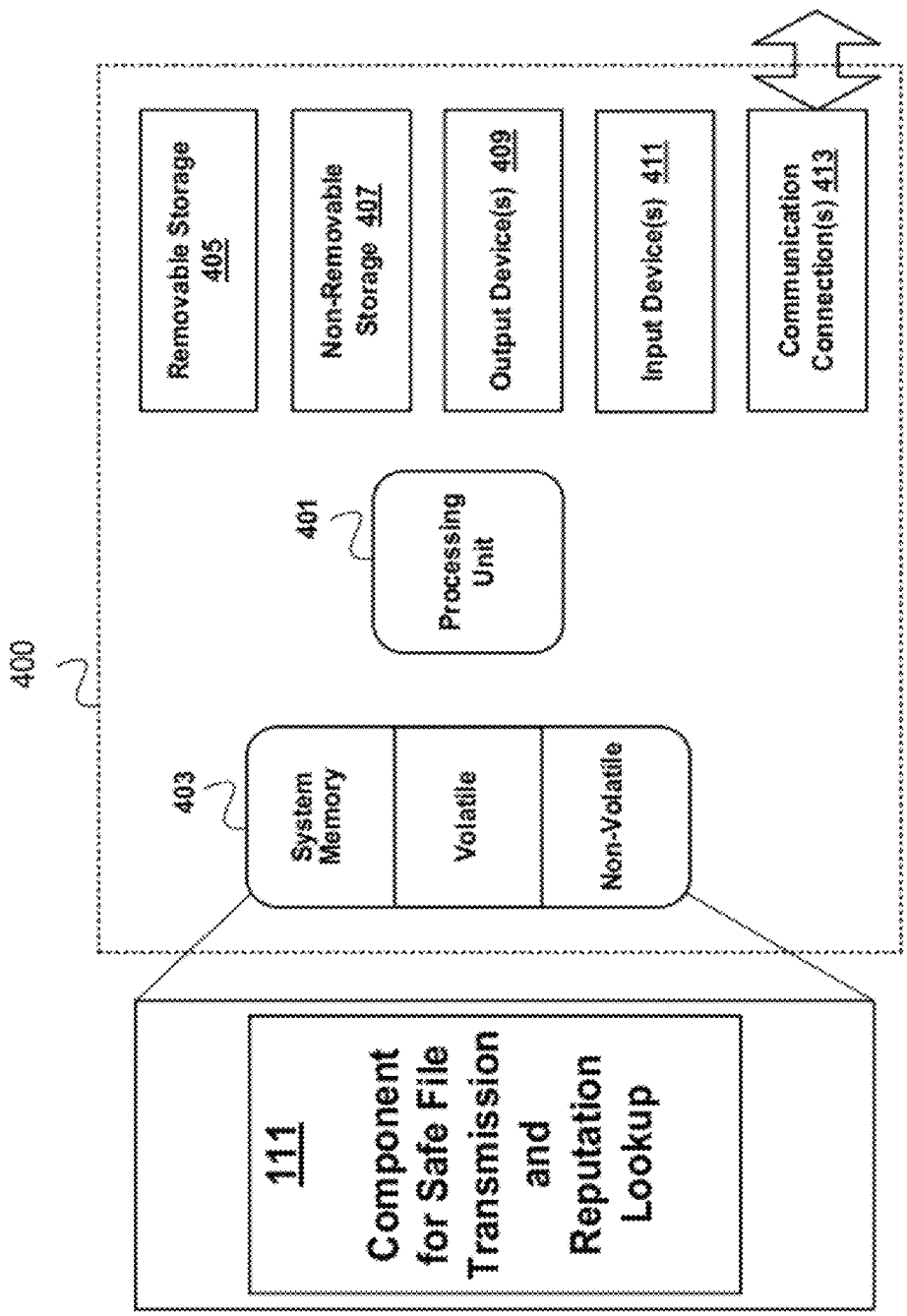
FIG. 4 shows an exemplary computing device 400 according to one embodiment.

FIG. 4 shows an exemplary computing device 400 according to one embodiment. Referring to FIG. 4, computing device 400 can be included as a part of computer systems (e.g., 102, 106 and 107 in FIG. 1A) used in accordance with one embodiment. Computing device 400 typically includes at least some form of computer readable media. Computer readable media can be any available media that can be accessed by computing device 400 and can include but is not limited to computer storage media.

In its most basic configuration, computing device 400 typically includes processing unit 401 and system memory 403. Depending on the exact configuration and type of computing device 400 that is used, system memory 403 can include volatile (such as RAM) and non-volatile (such as ROM, flash memory, etc.) elements or some combination of the two. In one embodiment, as shown in FIG. 4, component 111 for safe transmission of data files and reputation lookup can reside in system memory 403.

Additionally, computing device 400, especially the version that can be a part of file reputation server 107 in FIG. 1A, can include mass storage systems (removable 405 and/or non-removable 407) such as magnetic or optical disks or tape. Similarly, computing device 400 can include input devices 409 and/or output devices 411 (e.g., such as a display). Additionally, computing device 400 can include network connections 413 to other devices, computers, networks, servers, etc. using either wired or wireless media. As all of these devices are well known in the art, they need not be discussed in detail.

With reference to exemplary embodiments thereof, a safe data file transmission and reputation lookup methodology is disclosed. As a part of the safe file transmission and reputation lookup methodology, a data file that is to be made available to a file receiver is accessed and it is determined whether the data file needs to be provided a protective file. The data file is wrapped in a protective file to create a non-executing package file. Access is provided to the non-executing package file where the data file is prevented from being executed until reputation feedback is received.

In one embodiment, a mechanism by which a data file is automatically modified so that a data file receiver cannot directly open the attachment through their email application is provided. In one embodiment, a mechanism that determines what data files to wrap with the protected data files is provided. In one embodiment, a mechanism by which an application looks-up information about the reputation of a data file at a central application reputation service is provided.

In one embodiment, information about the quality of a data file is provided to the customer before the data file can be opened/executed by the data file receiver, for example information can be provided such as "This is the first time Windows Live™ has seen this type of file proceed cautiously" or "This file contains known malware and cannot be executed." In one embodiment, a mechanism by which an application is invoked by the data file receiver to return the data file to its original form is provided. In one embodiment, a mechanism by which a customer can override protection and gain access to a data file in the case a false-positive is made on a good file is provided. In one embodiment, a mechanism that sends telemetry about a data file receiver's behavior is provided. In one embodiment, a mechanism by which a data file receiver can contact a data file sender via a secure channel (e.g. a telephone call) to make sure a data file was actually sent by the data file sender and not by malware on the data file sender's computer before execution is provided.

The foregoing descriptions of specific embodiments have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A computer readable medium comprising instructions that when executed perform a method comprising:
wrapping a data file in a protective file based at least in part upon at least one of:

whether the data file was sent by an unknown sender with an internet protocol address;
whether malware has previously been received from the internet protocol address; or
whether malware has previously been received from a user associated with the data file,
the wrapping at least one of:
performed upon determining that the data file needs to be protected; or
creating a package file that inhibits at least one of access to or execution of the data file until data file reputation information is accessed.

2. The computer readable medium of claim 1, the wrapping based at least in part upon a likelihood that the data file comprises malware.

3. The computer readable medium of claim 1, the wrapping based at least in part upon whether the data file was sent by a sender associated with an address in a dynamic range.

4. The computer readable medium of claim 1, the method comprising:
accessing the data file reputation information from a reputation lookup service.

5. The computer readable medium of claim 1, the method comprising:
overriding a block on access to the data file after a warning indicating a level of suspiciousness associated with the data file is accessed, the level of suspiciousness based at least in part upon at least one of:
a number of users that executed the data file;
a number of times the data file has travelled through a network;
a first time and date the data file was observed;
whether the data file was reviewed by an analyst;
a certificate used to sign the data file;
a link to a company that controls the certificate; or
a link to at least one of a search page or a discussion group comprising information about the data file.

6. The computer readable medium of claim 1, at least some of the wrapping performed by a sender upon selection of the data file for transmission from the sender to a receiver.

7. The computer readable medium of claim 6, the data file transmitted from the sender to the receiver via at least one of an email message or an instant message.

8. The computer readable medium of claim 1, at least some of the wrapping performed by a receiver upon receiving the data file from a sender.

9. The computer readable medium of claim 8, the data file transmitted from the sender to the receiver via at least one of an email message or an instant message.

10. A system comprising:
one or more processing units; and
memory comprising instructions that when executed by at least one of the one or more processing units, perform a method comprising:
wrapping a data file in a protective file based at least in part upon at least one of:
whether the data file was sent by an unknown sender with an internet protocol address;
whether malware has previously been received from the internet protocol address; or
whether malware has previously been received from a user associated with the data file,
the wrapping at least one of:
performed upon determining that the data file needs to be protected; or
creating a package file that inhibits at least one of access to or execution of the data file until data file reputation information is accessed.

11. The system of claim 10, the wrapping based at least in part upon a likelihood that the data file comprises malware.

12. The system of claim 10, the wrapping based at least in part upon whether the data file was sent by a sender associated with an address in a dynamic range.

13. The system of claim 10, the method comprising:
accessing the data file reputation information from a reputation lookup service.

14. A method, comprising:
wrapping a data file in a protective file based at least in part upon at least one of:
whether the data file was sent by an unknown sender with an internet protocol address;
whether malware has previously been received from a second internet protocol address associated with the data file; or
whether malware has previously been received from a user associated with the data file,
the wrapping at least one of:
performed upon determining that the data file needs to be protected; or
creating a package file that inhibits at least one of access to or execution of the data file until data file reputation information is accessed.

15. The method of claim 14, the wrapping based at least in part upon a likelihood that the data file comprises malware.

16. The method of claim 14, the wrapping based at least in part upon whether the data file was sent by a sender associated with an address in a dynamic range.

17. The method of claim 14, comprising:
accessing the data file reputation information from a reputation lookup service.

18. The method of claim 14, comprising:
overriding a block on access to the data file after a warning indicating a level of suspiciousness associated with the data file is accessed, the level of suspiciousness based at least in part upon at least one of:
a number of users that executed the data file;
a number of times the data file has travelled through a network;
a first time and date the data file was observed;
whether the data file was reviewed by an analyst;
a certificate used to sign the data file;
a link to a company that controls the certificate; or
a link to at least one of a search page or a discussion group comprising information about the data file.

19. The method of claim 14, at least some of the wrapping performed by a sender upon selection of the data file for transmission from the sender to a receiver.

20. The method of claim 14, at least some of the wrapping performed by a receiver upon receiving the data file from a sender.

* * * * *